(12) United States Patent
Eleftheriou et al.

(10) Patent No.: US 9,353,626 B2
(45) Date of Patent: May 31, 2016

(54) ROTOR ASSEMBLY

(75) Inventors: Andreas Eleftheriou, Woodbridge (CA); Richard Ivakitch, Scarborough (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 931 days.

(21) Appl. No.: 13/614,584

(22) Filed: Sep. 13, 2012

(65) Prior Publication Data

US 2014/0072444 A1 Mar. 13, 2014

(51) Int. Cl.
| | |
|---|---|
| *F01D 5/02* | (2006.01) |
| *F02K 3/06* | (2006.01) |
| *F04D 29/26* | (2006.01) |
| *F16D 1/09* | (2006.01) |

(52) U.S. Cl.
CPC . *F01D 5/025* (2013.01); *F02K 3/06* (2013.01); *F04D 29/266* (2013.01); *F05D 2230/60* (2013.01); *F05D 2250/292* (2013.01); *F05D 2260/30* (2013.01); *F16D 2001/0903* (2013.01); *Y10T 29/49316* (2015.01)

(58) Field of Classification Search
CPC ............. F01D 5/025; Y10T 29/49316; Y10T 29/4932; Y10T 29/49936; F02K 3/06; F16D 1/09; F16D 2001/0903; F05D 2250/292; F05D 2230/60; F05D 2260/30; F04D 29/263; F04D 29/266; F04D 29/325; F04D 29/329
USPC ................... 416/244 A, 245 R; 29/889, 889.2
See application file for complete search history.

(56) References Cited

U.S. PATENT DOCUMENTS

| | | | | |
|---|---|---|---|---|
| 1,886,414 | A | * 11/1932 | Meyer | F01D 5/025 403/332 |
| 2,228,770 | A | 1/1941 | Le Tourneau | |
| 2,932,447 | A | 4/1960 | Phelon | |
| 3,307,423 | A | 3/1967 | Dansi | |
| 3,467,419 | A | * 9/1969 | Anderson | F01D 5/025 403/380 |

(Continued)

FOREIGN PATENT DOCUMENTS

DE          4445297 C1 *  3/1996  ............. F01D 5/025

*Primary Examiner* — Ninh H Nguyen
*Assistant Examiner* — Jesse Prager
(74) *Attorney, Agent, or Firm* — Norton Rose Fulbright Canada

(57) ABSTRACT

A rotor assembly for a gas turbine engine, with an annular sleeve having an inner member connected around the shaft to rotate together therewith and having an outer member with a first end connected to the inner member, the outer member defining an annular continuous frustoconical inner surface angled such as to extend closer to the central axis near the first end. A rotor disc includes an annular protuberance extending radially inwardly of the outer member and forced toward the first end, and having an annular continuous frustoconical outer surface complementary to the inner surface of the outer member and in torque-transmitting engagement therewith. The assembly includes means for axially pressing the sleeve and the disc against one another to maintain the complementary frustoconical surfaces in torque-transmitting engagement. A method of engaging a rotor disc to a driving shaft in a gas turbine engine is also provided.

20 Claims, 3 Drawing Sheets

(56) References Cited

U.S. PATENT DOCUMENTS

| | | | |
|---|---|---|---|
| 3,601,501 A * | 8/1971 | Johnson | F01D 5/025 403/258 |
| 3,604,819 A | 9/1971 | Krahe et al. | |
| 4,292,001 A * | 9/1981 | Snell | F01D 5/025 403/298 |
| 4,304,502 A * | 12/1981 | Stratienko | F16D 1/094 403/370 |
| 4,519,747 A * | 5/1985 | Yamazaki | F01D 5/025 29/432 |
| 4,569,114 A | 2/1986 | Ashcombe et al. | |
| 4,993,865 A | 2/1991 | Nagashima | |
| 5,158,390 A | 10/1992 | Ito et al. | |
| 5,188,478 A | 2/1993 | Bitsch et al. | |
| 5,245,954 A | 9/1993 | Donohue | |
| 5,716,156 A | 2/1998 | Bayer et al. | |
| 6,261,061 B1 | 7/2001 | Pfaffenberger | |
| 7,217,226 B2 | 5/2007 | Wasson et al. | |
| 7,527,479 B2 * | 5/2009 | Shi | F01D 5/025 416/241 A |
| 7,563,204 B2 | 7/2009 | Wasson et al. | |
| 7,610,831 B2 | 11/2009 | Burgler | |

\* cited by examiner

ROTOR ASSEMBLY

TECHNICAL FIELD

The application relates generally to a rotor assembly for a gas turbine engine and, more particularly, to the attachment of the rotor to the driving shaft in such an assembly.

BACKGROUND OF THE ART

Rotor assemblies in gas turbine engines typically include a rotor disc which is attached to a driving shaft, with the disc and shaft usually being made of the high strength material, for example titanium or steel. The disc and shaft are generally connected through a bolted joint, a spline attachment, or a curvic coupling, to ensure that the torque is transmitted from the shaft to the rotor disc. However, such connection features usually tend to produce high stress concentrations which may reduce the low cycle fatigue life of the assembly.

SUMMARY

In one aspect, there is provided a rotor assembly for a gas turbine engine, the assembly comprising: a rotatable shaft for driving engagement with a turbine rotor of the engine; an annular sleeve having an inner member connected around the shaft to rotate together therewith and having an outer member with a first end connected to the inner member, the outer member being located radially outwardly of and spaced apart from the inner member, the outer member defining an annular continuous frustoconical inner surface angled such as to extend closer to a central axis of the rotor assembly near the first end than away therefrom; a rotor having an annular disc and a plurality of blades extending radially outwardly therefrom, the disc having a central opening defined therethrough through which the shaft extends with an annular gap being defined between the shaft and the disc, the central opening being surrounded by an annular protuberance extending substantially axially, the protuberance being located radially inwardly of the outer member spaced apart from the first end of the outer member and spaced apart from the inner member, the protuberance defining a continuous frustoconical outer surface complementary to the frustoconical inner surface of the outer member and in torque-transmitting engagement therewith; a locking member engaged to the shaft and axially pressing one of the sleeve and the disc against the other of the sleeve and the disc with the other of the sleeve and the disc abutting a shoulder having a fixed axial position relative to the shaft, the locking member producing an axial force maintaining the protuberance pressed toward the first end of the outer member and maintaining the torque-transmitting engagement between the complementary frustoconical outer and inner surfaces.

In another aspect, there is provided a rotor assembly for a gas turbine engine, the assembly comprising: a rotatable shaft; an annular sleeve having an inner member connected around the shaft to rotate together therewith and having an outer member with a first end connected to the inner member, the outer member being located outwardly spaced apart from the inner member, the outer member defining an annular continuous frustoconical inner surface angled such as to extend closer to a central axis of the rotor assembly near the first end than away therefrom; a rotor having an annular disc with the sleeve and disc being axially movable relative to one another, the disc including an annular protuberance extending radially inwardly of the outer member and forced toward the first end, the protuberance having a continuous frustoconical outer surface complementary to the frustoconical inner surface of the outer member and in torque-transmitting engagement therewith, an annular gap being defined between the shaft and the disc and the disc being spaced apart from the inner member; and means for axially pressing the sleeve and the disc against one another to maintain the protuberance in forced engagement with the outer member and the complementary frustoconical surfaces in torque-transmitting engagement with one another.

In a further aspect, there is provided a method of engaging a rotor disc to a driving shaft in a gas turbine engine, the method comprising: retaining an annular sleeve around the driving shaft to prevent relative rotational movement therebetween; axially pressing the rotor disc and the sleeve against one another to force frictional engagement of complementary annular continuous tapered surfaces of an annular protuberance of the rotor disc and of an outer member of the sleeve surrounding the protuberance, the rotor disc and the sleeve being pressed into a relative position where a predetermined torque is necessary for the engaged tapered surfaces to slip relative to one another; and locking the protuberance and the sleeve in the relative position.

DESCRIPTION OF THE DRAWINGS

Reference is now made to the accompanying figures in which.

DETAILED DESCRIPTION

Figure 1:
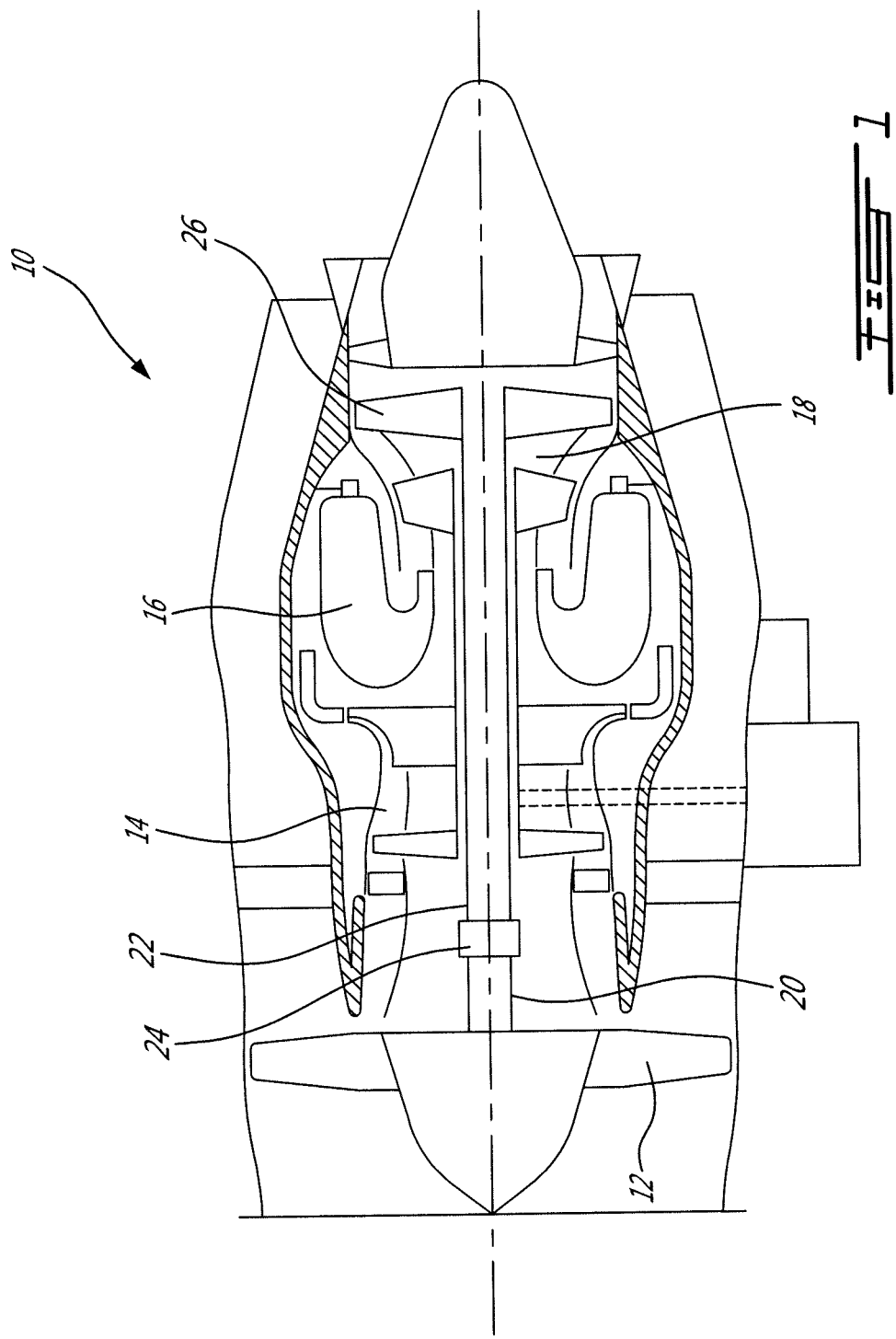
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

In the embodiment shown, the fan 12 is a geared fan: the fan drive shaft 20 is driven by the low pressure shaft 22 through a gearbox 24, and the low pressure shaft 22 is driven by low pressure rotor(s) 26 of the turbine section 18. In another embodiment, the fan drive shaft 20 may be directly driven by the low pressure shaft 22, for example by being integral therewith.

Figure 2:
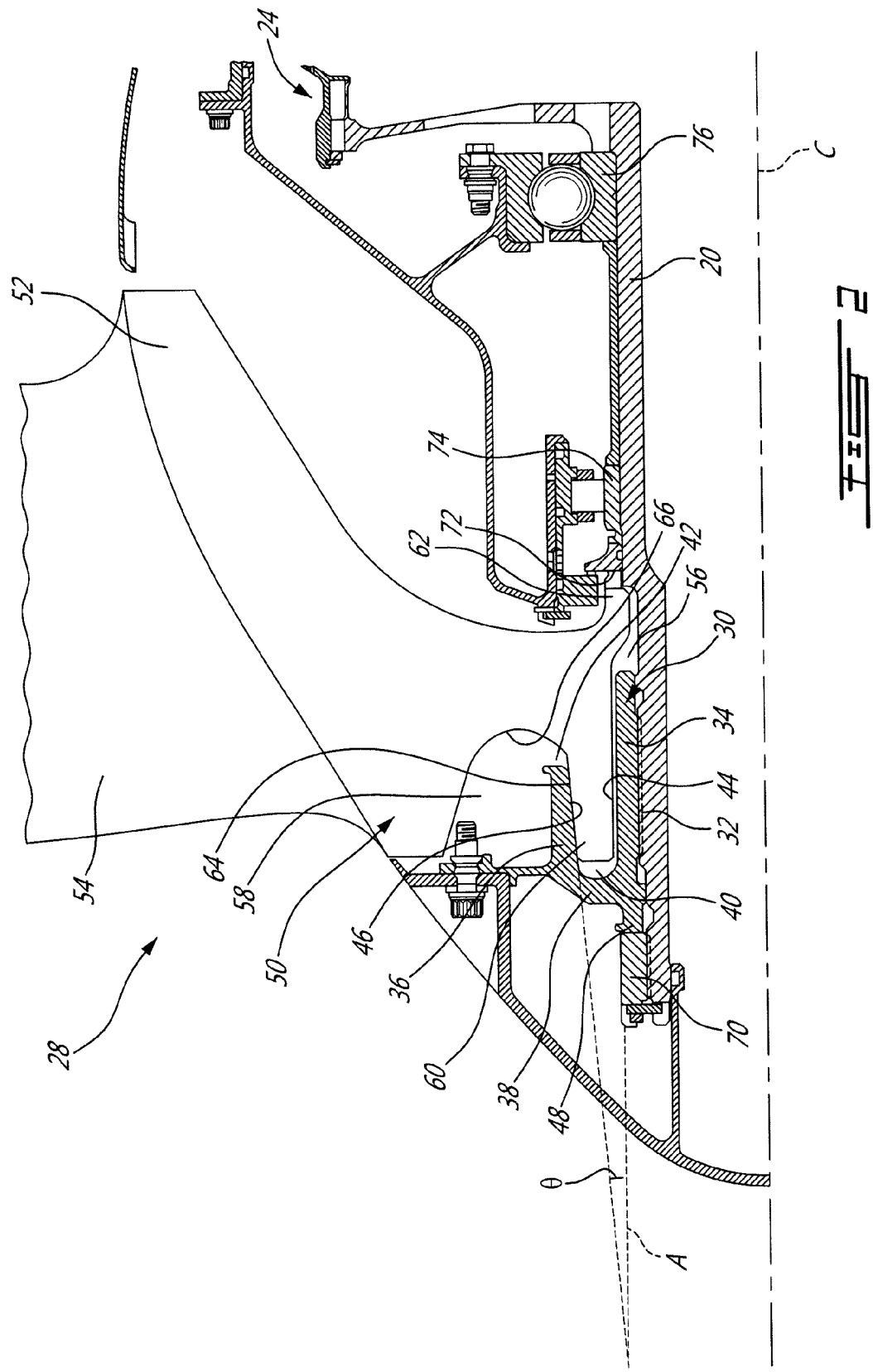
FIG. 2 is a schematic cross-sectional view of a fan assembly for a gas turbine engine such as shown in FIG. 1 in accordance with a particular embodiment.

Referring to FIG. 2, an attachment of the rotor 28 of the fan 12 with the fan drive shaft 20 in accordance with a particular embodiment is shown. An annular sleeve 30 has a "C" shape cross-section, defined by annular, substantially axially extending and concentric inner and outer members 34, 36. The inner member 34 is connected around the shaft 20 to rotate together therewith, for example through a spline connection 32. In the embodiment shown, the connection 32 allows relative axial movement between the sleeve 30 and the shaft 20, the purpose of which will be further detailed below.

The inner and outer members 34, 36 are radially spaced apart from one another and connected by a radially extending front end wall 38. The sleeve 30 thus defines an annular slot 40 opening into its rear end 42. The slot 40 is defined between first and second spaced apart annular surfaces 44, 46, the first surface 44 corresponding to the radially outer surface of the inner member 34 and the second surface 46 corresponding to the radially inner surface of the outer member 36. The annular inner surface 46 of the outer member 36 is frustoconical, and is angled to extend closer to the central axis C of the assembly near the front end wall 38 than away therefrom. The inner surface 46 of the outer member 36 is also continuous, i.e. it has a smooth regular surface free of slots, keys, splines or similar engagement members.

The front end of the sleeve 30 includes an annular abutment portion 48. In the embodiment shown, the abutment portion 48 is defined by an annular projection extending axially from the front end wall 38 and surrounding the shaft 20.

The fan rotor 28 has an annular disc 50 having an enlarged outer perimeter portion 52 on which are supported a plurality of blades 54 extending radially outwardly therefrom. The disc 50 also has a central opening 56 defined therethrough, through which the shaft 20 extends, with the disc 50 being located rearwardly of the sleeve 30. The front end of the disc 50 has an annular recess 58 defined therein, separating the enlarged outer perimeter portion 52 from an annular protuberance 60 extending substantially axially around the central opening 56. The curved rear profile of the disc 50 defines an annular abutment portion 62 extending substantially axially around the central opening 56 opposite to the protuberance 60, and opposite to the abutment portion 48 of the sleeve 30.

The protuberance 60 of the disc 50 is received in the slot 40 of the sleeve 30. The protuberance 60 defines a frustoconical outer surface 64 which is continuous, i.e. has a smooth regular surface free of slots, keys, splines or similar engagement members, and complementary to the inner surface 46 of the outer member 36 to define a torque transmitting engagement therewith.

The outer member 36 of the sleeve 30 is received in the annular recess 58 of the disc 50 and sized such that the rear end 42 of the outer member 36 is axially spaced apart from the adjacent front wall 66 of the disc 50. The central opening 56 of the disc 50 defines an annular gap between the first surface 44 of the slot 40 and the protuberance 60, and between the shaft 20 and the abutment portion 62 of the disc 50. As such, the insertion of the protuberance 60 within the slot 40 of the sleeve 30 is resisted only by the interference between the complementary frustoconical surfaces 46, 64.

A locking member 70 is engaged to the shaft 20 and presses axially against the abutment portion 48 of the sleeve 30, while the abutment portion 62 of the disc 50 abuts an annular shoulder 72 having a fixed axial position relative to the shaft 20. In the embodiment shown, the shoulder 72 is formed by the end of a cylindrical member 74 surrounding the shaft 20 and abutting the shaft bearing 76. The locking member 70 moves the sleeve 30 axially toward the disc 50; the abutment portion 62 in contact with the shoulder 72 prevents movement of the engaged disc 50 and sleeve 30 toward the shoulder 72. The pressure applied by the locking member 70 thus creates a clamping force which forces the insertion of the protuberance 60 to a predetermined position within the slot 40 and against the interference between the complementary frustoconical surfaces 46, 64.

Figure 3:
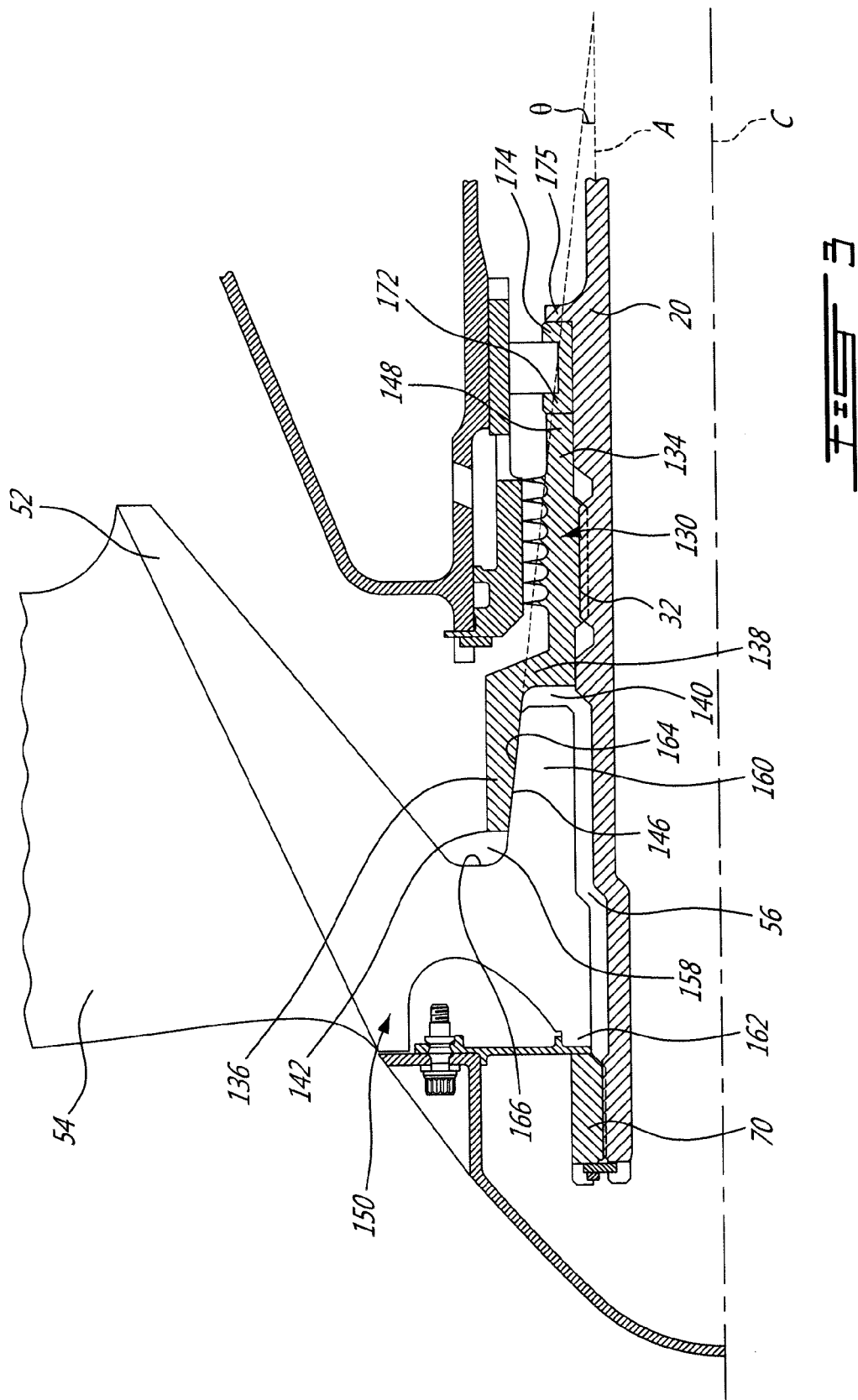
FIG. 3 is a schematic cross-sectional view of a fan assembly for a gas turbine engine such as shown in FIG. 1 in accordance with another particular embodiment.

Referring to FIG. 3, an attachment of the rotor 28 of the fan 12 with the fan drive shaft 20 in accordance with another embodiment is shown. The annular sleeve 130 has a "Z" shaped cross-section. The sleeve 130 thus includes annular, substantially axially extending inner and outer members 134, 136 which are radially and axially spaced apart from one another. The outer member 136 is located forwardly of the inner member 134, and the rear end of the outer member 136 and front end of the inner member 134 are interconnected by a radial wall 138 extending at least approximately along the radial direction. The inner member 134 is connected around the shaft 20 to rotate together therewith while allowing relative axial movement, for example through the spline connection 32, and an annular slot 140 is defined between the outer member 136 and the shaft 20. The annular radially inner surface 146 of the outer member 136 is frustoconical and is angled to extend closer to the central axis C of the assembly near the radial wall 138 than away therefrom. The inner surface 146 of the outer member 136 is also continuous, i.e. it has a smooth regular surface free of slots, keys, splines or similar engagement members.

The rear end of the sleeve 130 includes an annular abutment portion 148, defined by the rear end of the inner member 134.

The fan disc 150 is located forwardly of the sleeve 130. The rear end of the disc 150 has an annular recess 158 defined therein, separating the enlarged outer perimeter portion 52 from an annular protuberance 160 extending substantially axially around the central opening 56 of the disc 150. The curved front profile of the disc 150 defines an annular abutment portion 162 extending substantially axially around the central opening 56 opposite to the protuberance 160, and opposite to the abutment portion 148 of the sleeve 130.

The protuberance 160 of the disc 150 is received inwardly of the outer member 136 of the sleeve 130. The protuberance 160 defines a frustoconical outer surface 164 which is continuous, i.e. has a smooth regular surface free of slots, keys, splines or similar engagement members, and complementary to the inner surface 146 of the outer member 136 of the sleeve 130 to define a torque transmitting engagement therewith.

The outer member 136 of the sleeve 130 is received in the annular recess 158 of the disc 150 and sized such that the front end 142 of the outer member 136 is axially spaced apart from the adjacent rear wall 166 of the disc 150. The central opening 56 of the disc 150 defines an annular gap between the shaft 20 and the disc 150. As such, the insertion of the protuberance 160 inwardly of the outer member 136 of the sleeve 130 is resisted only by the interference between the complementary frustoconical surfaces 146, 164.

The locking member 70 is engaged to the shaft 20 and presses axially against the abutment portion 162 of the disc 150, while the abutment portion 148 of the sleeve 130 abuts an annular shoulder 172 having a fixed axial position relative to the shaft 20. In the embodiment shown, the shoulder 172 is formed by the inner race 174 of a shaft bearing in abutment with a shoulder 175 defined in the shaft 20. The locking member 70 moves the disc 150 axially toward the sleeve 130; the abutment portion 148 in contact with the shoulder 172 prevents movement of the engaged disc 150 and sleeve 130 toward the shoulder 172. The pressure applied by the locking member 70 thus creates a clamping force which forces the insertion of the protuberance 160 to a predetermined position inwardly of the sleeve outer member 136 and against the interference between the complementary frustoconical surfaces 146, 164.

In a particular embodiment, the locking member 70 is a retaining nut threadingly engaged to the shaft 20 and threaded to press against the abutment portion 48 of the sleeve 30 (FIG. 2) or the abutment portion 162 of the disc 150 (FIG. 3). Other types of locking members can alternately be used.

The retaining nut 70 is engaged to the shaft 20 with a predetermined torque which produces a desired force against the corresponding abutment portion 48, 162 to force the protuberance 60, 160 to the predetermined position. This forced engagement of the protuberance 60, 160 with the sleeve outer member 36, 136 creates the torque-transmitting engagement of the frustoconical surfaces 46, 64, 146, 164. In a particular embodiment, the predetermined torque is a function of the frustoconical angle definition of the joint and the transmitting torque requirement of the system. The selected angle of the joint also is such that the force required to split the connected frustoconical surfaces 46, 64, 146, 164 i.e. to produce a relative slipping movement therebetween, is within the structural requirements of the assembly as a whole.

The angle θ of the frustoconical surfaces 46, 64, 146, 164 is selected such as to be able to transmit the required torque of the fan rotor 28 at all engine conditions. In a particular embodiment, the angle θ is at least 3° and at most 10° from the axial direction A. In a particular embodiment, the angle θ is about 7° from the axial direction A.

In a particular embodiment, the frustoconical surfaces 46, 64, 146, 164 are manufactured using a turning process.

The engaged continuous frustoconical surfaces 46, 64, 146, 164 may be particularly beneficial when the fan disc 50, 150 is made of a material less rigid than that of the sleeve 30, 130, and in which case stress concentrations produced by a spline, bolted joint, curvic coupling or similar attachment may be unacceptable. For example, in a particular embodiment the disc 50, 150 is made of aluminium and the sleeve 30, 130 is made of titanium or steel. The engaged continuous frustoconical surfaces 46, 64, 146, 164 may allow for stress concentrations at the connection to be reduced, and may increase the low cycle fatigue life of the assembly.

The engaged continuous frustoconical surfaces 46, 64, 146, 164 may also be used between other rotors of the gas turbine engine 10 and their respective driving shaft, for example on small diameter rotors and/or rotors rotating at relatively slow speeds such as geared rotors, in the cold section of the engine 10. For example, the engaged continuous frustoconical surfaces 46, 64, 146, 164 may be used to connect a booster rotor to its driving shaft.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A rotor assembly for a gas turbine engine, the assembly comprising:
   a rotatable shaft for driving engagement with a turbine rotor of the engine;
   an annular sleeve having concentric inner and outer members interconnected by a radially extending end wall, the inner member connected around the shaft to rotate together therewith, the outer member being located radially outwardly of and spaced apart from the inner member, the outer member defining an annular continuous frustoconical inner surface angled such as to extend closer to a central axis of the rotor assembly near the end wall than away therefrom;
   a rotor having an annular disc including an outer perimeter portion having a plurality of blades extending radially outwardly therefrom, the disc having a central opening defined therethrough through which the shaft extends with an annular gap being defined between the shaft and the disc, the disc having an annular recess defined therein separating the outer perimeter portion from an annular protuberance extending substantially axially, the central opening being surrounded by the annular protuberance;
   wherein the outer member of the sleeve is received in the recess of the disc with the protuberance being located radially inwardly of the outer member, the protuberance being spaced apart from the end wall and the inner member of the sleeve, the protuberance defining a continuous frustoconical outer surface complementary to the frustoconical inner surface of the outer member and in torque-transmitting engagement therewith; and
   a locking member engaged to the shaft and axially pressing one of the sleeve and the disc against the other of the sleeve and the disc with the other of the sleeve and the disc abutting a shoulder having a fixed axial position relative to the shaft, the locking member producing an axial force maintaining the protuberance pressed toward the first end of the outer member and maintaining the torque-transmitting engagement between the complementary frustoconical outer and inner surfaces.

2. The assembly as defined in claim 1, wherein the disc is made of an aluminium alloy and the sleeve is made of a material more rigid than the aluminium alloy.

3. The assembly as defined in claim 2, wherein the sleeve is made of titanium or steel.

4. The assembly as defined in claim 1, wherein the locking member abuts the sleeve.

5. The assembly as defined in claim 1, wherein the frustoconical surfaces extend at an angle of at least 3° and at most 10° with respect to an axial direction of the rotor.

6. The assembly as defined in claim 1, wherein the frustoconical surfaces extend at an angle of 7° with respect to an axial direction of the rotor.

7. The assembly as defined in claim 1, wherein the shoulder in abutment with the other of the sleeve and the disc is defined by an end of a cylindrical member surrounding the shaft and abutting an element fixedly connected to the shaft or a shoulder of the shaft.

8. The assembly as defined in claim 1, wherein the locking member is a retaining nut threadingly engaged to the shaft.

9. The assembly as defined in claim 1, wherein the rotor is a fan rotor.

10. A method of engaging a rotor disc to a driving shaft in a gas turbine engine, the method comprising:
    retaining an annular sleeve having concentric inner and outer members interconnected by a radial endwall around the driving shaft to prevent relative rotational movement therebetween;
    inserting the outer member of the annular sleeve in a recess of the rotor disc, the rotor disc having an annular protuberance bordering the recess and located radially inwardly of the outer member, wherein the protuberance is spaced from the end wall and the inner member of the sleeve;
    axially pressing the rotor disc and the sleeve against one another to force frictional engagement of complementary annular continuous tapered surfaces of the annular protuberance of the rotor disc and of the outer member of the sleeve surrounding the protuberance, the rotor disc and the sleeve being pressed into a relative position where a predetermined torque is necessary for the engaged tapered surfaces to slip relative to one another; and
    locking the protuberance and the sleeve in the relative position.

11. The method as defined in claim 10, wherein pressing the rotor disc and the sleeve against one another includes abutting one of the sleeve and the rotor disc against an annular shoulder having a fixed axial position relative to the driving shaft and applying a force on the other of the sleeve and rotor disc against the shoulder.

12. The method as defined in claim 11, wherein applying the force includes threadingly engaging a retaining member on the shaft against the other of the sleeve and the disc.

13. The method as defined in claim 12, wherein locking the protuberance and the sleeve is performed with the retaining member.

14. The assembly as defined in claim 1, wherein the inner member, outer member and end wall cooperate to form a "C" shaped cross-section, the sleeve defining an annular slot between the inner and outer members, the protuberance of the disc being received in the annular slot, a secondary annular gap being defined between the protuberance and the inner member.

15. The assembly as defined in claim 14, wherein the sleeve further includes an annular abutment portion extending from the end wall opposite the inner member, the locking member abutting the annular abutment portion.

16. The assembly as defined in claim 1, wherein the inner and outer members are axially spaced apart, the inner member, outer member and end wall cooperating to define a "Z" shaped cross-section.

17. The assembly as defined in claim 16, wherein a free end of the inner member of the sleeve defines an annular abutment portion abutting the shoulder having the fixed axial position.

18. The assembly as defined in claim 1, wherein the disc includes an annular abutment portion extending around the central opening opposite the protuberance, the locking member engaging the sleeve, the abutment portion abutting the shoulder having the fixed axial position.

19. The assembly as defined in claim 7, wherein the cylindrical member surrounding the shaft abuts the shoulder of the shaft, the cylindrical member being an inner race of a shaft bearing.

20. The assembly as defined in claim 1, wherein a free end of the outer member of the sleeve is axially spaced apart from an adjacent radial wall in the recess of the disc.

\* \* \* \* \*